United States Patent [19]
Hindle

[11] Patent Number: 5,549,238
[45] Date of Patent: Aug. 27, 1996

[54] HEAT EXCHANGER BRAZING TRAY

[75] Inventor: Clive R. Hindle, Fort Worth, Tex.

[73] Assignee: Zexel USA Corporation, Decatur, Ill.

[21] Appl. No.: 577,069

[22] Filed: Dec. 22, 1995

Related U.S. Application Data

[63] Continuation of Ser. No. 322,186, Oct. 12, 1994, abandoned.

[51] Int. Cl.$^6$ .......................... B23K 31/02; B23K 37/04
[52] U.S. Cl. ..................... 228/183; 228/44.3; 269/286; 269/289 R
[58] Field of Search ................................ 228/183, 212, 228/44.3, 49.1; 269/21, 286, 289 R, 129; 29/726.5, 281.1

[56] References Cited

U.S. PATENT DOCUMENTS

| | | | |
|---|---|---|---|
| 2,443,574 | 6/1948 | Burns | 228/183 |
| 3,473,210 | 10/1969 | Klank | 29/890.39 |
| 3,726,466 | 4/1973 | Vedder et al. | 228/44.3 |
| 3,941,293 | 3/1976 | Chartet | 228/183 |
| 4,128,235 | 12/1978 | Gersbacher | 228/183 |
| 4,155,157 | 5/1979 | Gersbacher | 228/44.3 |
| 4,377,024 | 3/1983 | Saperstein | 228/183 |
| 4,700,469 | 10/1987 | Kroetsch et al. | 29/726 |
| 4,830,259 | 5/1989 | Lewis | 228/183 |
| 5,004,045 | 4/1991 | Le Gauyer | 228/212 |
| 5,058,662 | 10/1991 | Nguyen | 228/183 |
| 5,165,163 | 11/1992 | Pardi | 228/44.3 |
| 5,205,462 | 4/1993 | Croiser et al. | 228/44.3 |
| 5,206,990 | 5/1993 | Wright | 29/726 |
| 5,450,997 | 9/1995 | Turak et al. | 228/183 |

FOREIGN PATENT DOCUMENTS

| | | | |
|---|---|---|---|
| 9576 | 1/1982 | Japan | 228/183 |
| 10068 | 1/1988 | Japan | 228/183 |
| 281771 | 11/1988 | Japan | 228/183 |
| 89564 | 3/1990 | Japan | 228/183 |
| 175074 | 7/1990 | Japan | 228/183 |

OTHER PUBLICATIONS

Metals Handbook Ninth Edition, vol. 5, pp. 361–374, "Thermal Spray Coatings", copyright 1982.
Metals Handbook Ninth Edition, vol. 6, pp. 930,940,941, 992,1016, copyright 1983.

Primary Examiner—Samuel M. Heinrich
Attorney, Agent, or Firm—James E. Bradley

[57] ABSTRACT

A method and brazing fixture are provided for passing a plurality of heat exchanger components through a brazing furnace to provide a heat exchanger for use in a motor vehicle air conditioning system. The brazing fixture includes a reusable brazing tray having a flat planar surface for securing the heat exchanger components thereto, in alignment for passing through the brazing furnace. The heat exchanger components include refrigerant flow tubes and fin stock, which are placed alongside of the planar surface, with the planar surface extending substantially along the full length of the fin stock to prevent high fin. Circulation ports extend through the brazing tray in a honeycomb pattern along the planar surface, for passing heated gases within the brazing furnace between the fin stock and flow tubes. The planar surface of the brazing tray is formed from a material to which the heat exchanger components will not braze, and which will not tend to stick to brazing flux.

12 Claims, 1 Drawing Sheet

HEAT EXCHANGER BRAZING TRAY

This is a continuation of application Ser. No. 08/322,186, filed Oct. 12, 1994, now abandoned.

BACKGROUND OF THE INVENTION

1. Field of the Invention

The present invention relates in general to heat exchanger assembly fixtures for securing assembly components thereto and passing through a brazing furnace to join the assembly components into a singular unit to provide a heat exchanger for use in motor vehicle air conditioning systems.

2. Description of the Prior Art

Prior art brazing fixtures have been used for passing heat exchanger assembly components through a brazing furnace to join the components into a singular unit, which comprises a heat exchanger for use in a motor vehicle air conditioning system. The heat exchanger components are often made of an aluminum alloy having a brazing clad. Typically, the heat exchanger components are secured to a brazing fixture to hold the components in proper alignment for passing through a brazing furnace, flowing the brazing clad and fusing the components together. If the brazing fixture does not hold each of the components in the proper alignment, the heat exchanger may be formed with unacceptable defects.

Such unacceptable defects include the phenomena which occurs when fin stock within heat exchangers does not stay within acceptable tolerances for alignment with heat exchanger refrigerant flow tubes. This category of defect is often termed "high fin". Fin stock is flexible, and requires mechanical support to extend for any significant length in a particular direction. This is usually not a problem when heat exchanger assemblies are passed through brazing furnaces in a vertical disposition. However, when heat exchanger assemblies are passed through brazing furnaces in a horizontal disposition, that is, laid on their sides, mechanical support is essential to retain the fin stock in a properly aligned position.

Mechanical support for fin stock has been supplied by forming and assembling refrigerant flow tubes in heat exchanger assemblies with clearances between the flow tubes sized for retaining the fin stock in position. Further, prior art brazing fixtures have been supplied with bars and bands for retaining the fin stock in position. However, the bars and bands of prior art brazing fixtures extend only partially over the length of pieces of fin stock, usually retaining the fin stock at only two places along the length of a particular piece of fin stock. Prior art brazing fixtures only fully extended along the ends of a heat exchanger assembly, not the side faces through which cooling air is intended to pass during in actual operation of the finished heat exchanger.

FIG. 1 is a cross sectional view of a heat exchanger 11 secured to a prior art brazing fixture 12, and depicts the phenomena termed "high fin." Heat exchanger 11 is formed by a plurality of components which include header tanks 13, refrigerant flow tubes 15, and fin stock 17. The plurality of heat exchanger components 13, 15, and 17 are secured to prior art brazing fixture 12 by two metal bands 19. The two bands 19 do not extend all the way across the length of flow tubes 15 and fin stock 17, rather they only secure fin stock 17 within refrigerant flow tubes 15 at two places. Thus, portion 25 of fin stock 17 is free to sag with a high fin displacement such that fin stock edge 21 extends beyond edge 23 of refrigerant flow tubes 15.

If the high fin displacement at portion 25 of fin stock 17 exceeds acceptable quality control parameters, the heat exchanger is rejected and must be either scrapped or reworked until the high fin displacement in portion 25 falls within acceptable parameters. Thus, high fin results in lower production yield rates and additional rework steps, increasing costs for producing heat exchangers.

SUMMARY OF THE INVENTION

A method and brazing fixture are provided for passing a plurality of heat exchanger components through a brazing furnace to provide a heat exchanger for use in a motor vehicle air conditioning system. The brazing fixture includes a reusable brazing tray having a flat planar surface for securing the heat exchanger components thereto, in alignment for passing through the brazing furnace. The heat exchanger components include refrigerant flow tubes and fin stock, which are placed alongside of the planar surface, with the planar surface extending substantially along the full length of the fin stock to prevent high fin. Circulation ports extend through the brazing tray in a honeycomb pattern along the planar surface, for passing heated gases within the brazing furnace between the fin stock and flow tubes. The planar surface of the brazing tray is formed from a material to which the heat exchanger components will not braze, and which will not tend to stick to brazing flux.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
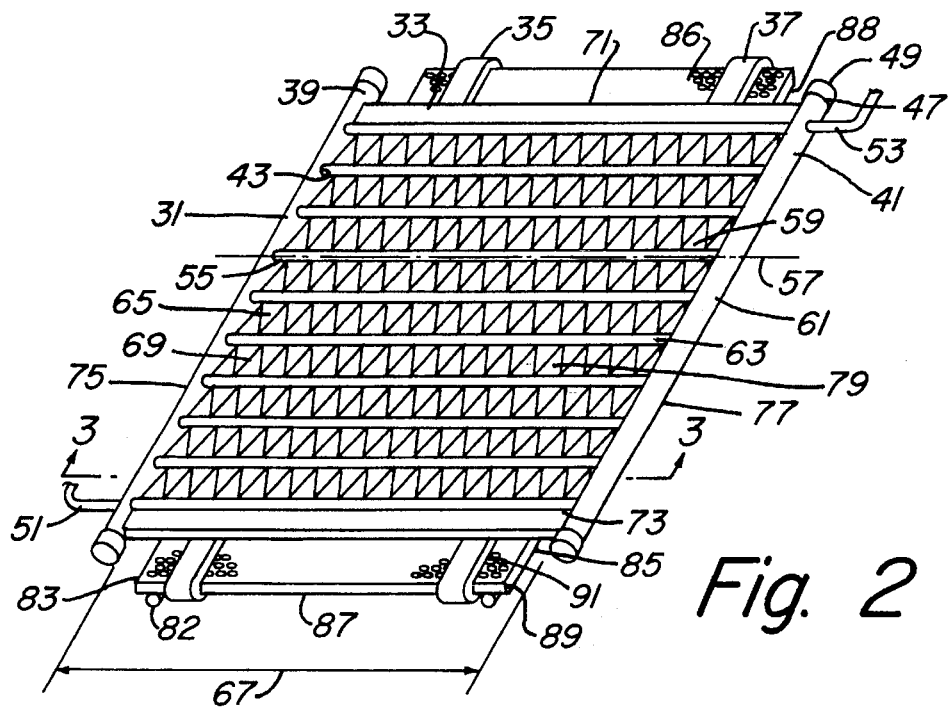
FIG. 2 is a perspective view depicting a heat exchanger secured to a brazing fixture according to the present invention.

FIG. 2 depicts a perspective view of heat exchanger 31, secured to brazing fixture 33 by bands 35 and 37. Heat exchanger 31, as shown, is a condenser for use in an air conditioning system for a motor vehicle. Components of heat exchanger 31 are secured to brazing fixture 33 in alignment for passing through a brazing furnace, and brazing together into a singular unit, heat exchanger 31. The components for heat exchanger 31 are formed from an aluminum alloy having a brazing clad. The brazing clad flows in a brazing furnace, which may be operated at temperatures in excess of 1100° F. to braze the various heat exchanger components together into the singular unit.

Heat exchanger 31 includes header tanks 39, 41, which have inward facing holes 43. Baffles are placed within header tanks 39, 41 to route fluid flow within heat exchanger 31. End openings 47 are sealed within end caps 49, which are brazed in place within the brazing furnace. Inlet 51 is provided for passing refrigerant into heat exchanger 31, and outlet 53 is provided for discharging refrigerant from heat exchanger 31.

Figure 1:
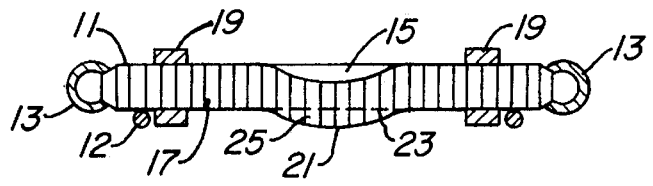
FIG. 1 is a cross sectional view of a heat exchanger secured to a prior art brazing fixture for passing through a brazing furnace, and depicts the high fin phenomena.

Flow tubes 55 have ends which are inserted into inward facing holes 43 of header tanks 39 and 41. Flow tubes 55 have longitudinal axes, such as longitudinal axis 57 depicted in FIG. 1. Longitudinal axis 57 extends between opposite sides 59 and 61 for the particular one of flow tubes 55 for which longitudinal axis 57 is shown. Flow tubes also have leading and trailing edges 63, which are the sides of flow tubes 55 which extend forward and rearward the most with respect to the side faces of heat exchanger 31.

Fin stock 65 is provided by corrugated metal strips which are inserted between flow tubes 55 for brazing to flow tubes 55 for increasing the heat transfer surface area. Fin stock 65 extends over length 67, parallel to the longitudinal axes of flow tubes 55, with edges 69 of fin stock 65 disposed proximate to forward and rearward edges 63 of flow tubes 55. It should be noted that edges 69 of fin stock 65 need not be exactly aligned with forward and rearward edges 63 of flow tubes 55, but need merely remain proximate to, or nearly aligned with, forward and rearward edges 63 to remain within an acceptable degree of tolerance. The tolerance is determined by the appropriate quality control criteria for a particular heat exchanger product.

Figure 3:
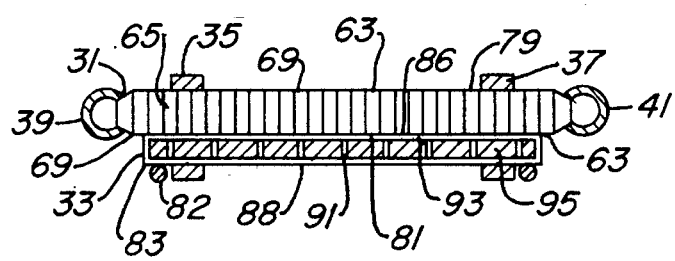
FIG. 3 is sectional view of the brazing fixture according to the present, taken along section line 3—3 of FIG. 2.

Heat exchanger 31 is herein defined to have a general shape with ends 71, 73, 75, 77, and side faces 79 and 81 (shown in FIG. 3). Ends 71 and 73 define the top and bottom, respectively, for heat exchanger 31. Ends 75 and 77 are defined by the outer edges of header tanks 39, 41, respectively. Side faces 79 and 81 (shown in FIG. 3) are defined by the forward and rearward edges 63 of flow tubes 55 and fin stock 65, which provide two opposite faces through which ambient air is intended to pass in flowing between flow tubes 55 and fin stock 65 when a finished heat exchanger is in use. Thus, heat exchanger 31 has large, flat surfaces 79 and 81, and ends 71, 73, 75, and 77 which are much thinner than surfaces 79 and 81, and defined at the edges of surfaces 79 and 81.

Brazing fixture 33 includes frame 82 and brazing tray 83. In some embodiments of the present invention, frame 82 is optional. Brazing tray 83 extends with length 85, width 87 and thickness 89, which together define two flat, planar surfaces 86 and 88 on opposite sides of brazing tray 83. Holes 91 extend through thickness 89 of brazing tray 83 in a honeycomb pattern. It should be noted that a honeycomb pattern is herein defined to not require holes having hexagonal sides, but that rather refers to holes of any shape arranged in a pattern resembling a honeycomb. Further, holes 91 in brazing tray 83 need not be round, but may also be of other shapes such as oblong, rectangular, square, or hexagonal.

FIG. 3 depicts a sectional view of heat exchanger 31 and brazing fixture 33, taken along section line 3—3 of FIG. 2. Brazing fixture 33 includes frame 82 and brazing tray 83. Brazing tray 83 has ceramic coating 93 deposited to substrate 95. Coating 93 is a ceramic coating comprising alumina zirconium, available from Raymond Engineering, Inc., a subsidiary of Kaman Corporation, of Middletown Conn. In the preferred embodiment of the present invention, substrate 95 is a perforated plate formed from 304 stainless steel, one sixteenth (1/16) of an inch thick. In other embodiments of the present invention, substrate 95 may be formed from expanded metal. Substrate 95 is rigid, so that it will maintain a flat shape for planar surfaces 86 and 88.

Figure 4:
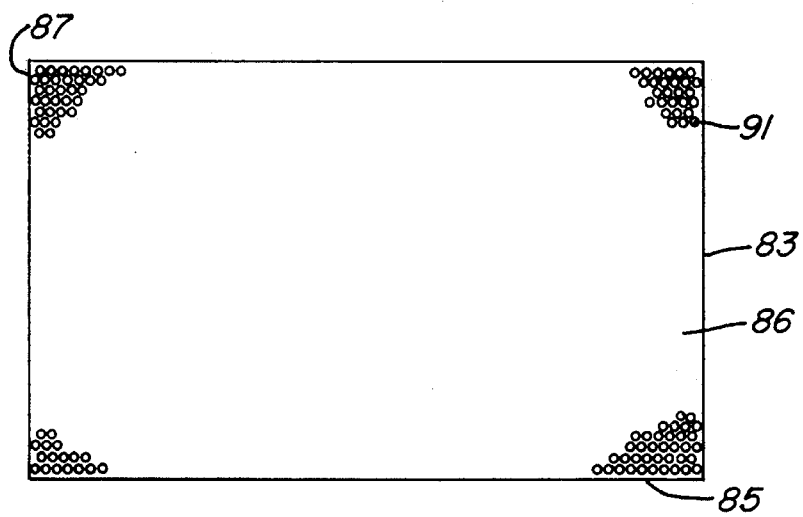
FIG. 4 is a top view of a brazing tray included in the brazing fixture of FIG. 2.

FIG. 4 is a top view of brazing tray 83, having holes 91. Holes 91 are round, and extend in the honeycomb pattern, as provided by the perforated substrate plate 95. Holes 91 extend through substrate 95, measuring one quarter (1/4) inch in diameter, and staggered at five sixteenths (5/16) inch centers.

The operation for securing a heat exchanger components to brazing tray 83 for passing through a brazing furnace is now described. Header tanks 39, 41, and caps 49, flow tubes 55, and fin stock 65 are placed on brazing tray 83, arranged for passing through the brazing furnace. Flat, planar surface 86 of brazing tray 83 extends substantially along the full length of flow tubes 55 and fin stock 65. Heat exchanger components 39, 41, 55, and 65 are secured to brazing tray 83 by bands 35, 37. Edges 63 of flow tubes 55 will be touching and flush with brazing tray 83 and fin stock 65. Brazing tray 83 and the plurality of components for heat exchanger 31 are then passed through a brazing furnace to braze the plurality components into a singular unit, to provide heat exchanger 31.

Since brazing tray 83 is formed of ceramic and stainless steel, brazing tray 83 is not brazed to heat exchanger 31. Further, ceramic coating 93 provides a non-stick surface for preventing flux from adhering to brazing tray 83, making removal of heat exchanger 31 from brazing tray 83 easier. Ceramic coating 93 also prevents the flux from etching portions of the substrate 95, which after repeated use may allow substrate 95 to braze to heat exchanger 31. Brazing tray 83 is reuseable, and may be passed through the brazing furnace numerous times for brazing together different heat exchangers.

Brazing tray 83 has a flat, planar surface which is placed along side face 79 of heat exchanger 31. Thus, the flat, planar surface of brazing tray 83 extends substantially along the full length 67 of edges 69 of fin stock 65 to prevent high fin. Circulation ports 91 pass heated gases within the furnace through brazing tray 83, and between flow tubes 55 and fin stock 65. Brazing tray 83 is rigid so that planar surfaces 86 and 88 will remain flat.

The present invention has advantages over prior art of brazing fixtures. A brazing fixture according to the present invention includes a flat, planar surface which extends substantially along the full length of fin stock to prevent high fin. The planar surface has a ceramic coating to provide a non-stick surface, so that a heat exchanger is easily removed from the brazing fixture after passing through a brazing furnace. Further, the heat exchanger components will not braze to the brazing fixture, and a brazing tray according to the present invention can be reused numerous times.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

I claim:

1. A method for brazing a plurality of heat exchanger components together to form a heat exchanger of a motor vehicle air conditioning system, the method comprising the steps of:

providing heat exchanger components, which include header tanks, refrigerant flow tubes and pieces of fin stock;

providing a brazing fixture having a planar surface formed from a material to which the heat exchanger components will not braze when passing through the brazing furnace;

securing the heat exchanger components to the brazing fixture, with the header tanks spaced apart and aligned parallel to one another, the refrigerant flow tubes extending between the header tanks in a spaced apart and parallel arrangement, and the pieces of fin stock extending between the header tanks and disposed between adjacent ones of the refrigerant flow tubes;

wherein the step of securing the heat exchanger components to the brazing fixture includes disposing longitudinal axes of the refrigerant flow tubes and edges of the pieces of fin stock parallel to the planar surface of the brazing fixture, with substantially a full length of the edges on one side of the pieces of fin stock extending adjacent to the planar surface;

passing the heat exchanger components and the brazing fixture through a brazing furnace to braze the heat exchanger components into a singular unit for use as a heat exchanger; and removing the heat exchanger from the brazing fixture, with the edges of the pieces of fin stock extending proximately between outermost sides of the adjacent pairs of the refrigerant flow tubes.

2. The method according to claim 1, wherein substantially the full length of the edges on the one side of the pieces of fin stock are in direct contact with the planar surface of the brazing fixture when secured to the brazing fixture.

3. The method according to claim 1, wherein the step of securing the heat exchanger components to the brazing fixture includes disposing sides of the refrigerant flow tubes directly against the planar surface of the brazing fixture.

4. The method according to claim 1, wherein:

the step of providing the brazing fixture includes providing the brazing fixture with circulation ports extending through the planar surface of the brazing fixture; and the step of passing the heat exchanger components and the brazing fixture through the brazing furnace includes passing heated gases from within the brazing furnace through circulation ports extending through the planar surface of the brazing fixture to pass the heated gases between the pieces of fin stock and the refrigerant flow tubes.

5. The method according to claim 1, wherein the planar surface of the brazing fixture extends substantially the full distance between the header tanks, in direct contact with one of the edges of the fin stock and sides of the refrigerant flow tubes when the heat exchanger components are secured to the brazing fixture.

6. The method according to claim 1, wherein the step of passing the heat exchanger components and the brazing fixture through the brazing furnace comprises maintaining the planar surface of the brazing tray substantially horizontal and beneath the pieces of fin stock when brazing the pieces of fin stock to the refrigerant flow tubes.

7. A method for brazing a plurality of heat exchanger components together to form a heat exchanger of a motor vehicle air conditioning system, the method comprising the steps of:

providing heat exchanger components, which include header tanks, refrigerant flow tubes and pieces of fin stock;

providing a brazing fixture having a planar surface formed from a material to which the heat exchanger components will not braze when passing through the brazing furnace;

securing the heat exchanger components to the brazing fixture, with the header tanks spaced apart and aligned parallel to one another, the refrigerant flow tubes extending between the header tanks in a spaced apart and parallel arrangement, and the pieces of fin stock extending between the header tanks and disposed between adjacent ones of the refrigerant flow tubes;

wherein the step of securing the heat exchanger components to the brazing fixture includes disposing sides of the refrigerant flow tubes directly against the planar surface of the brazing fixture, with substantially a full length of the edges on one side of the pieces of fin stock extending adjacent to the planar surface;

passing the heat exchanger components and the brazing fixture through a brazing furnace to braze the heat exchanger components into a singular unit for use as a heat exchanger;

when passing the heat exchanger components through the brazing furnace, maintaining the planar surface of the brazing tray substantially horizontal and beneath the pieces of fin stock when brazing the pieces of fin stock to the refrigerant flow tubes; and removing the heat exchanger from the brazing fixture, with the edges of the pieces of fin stock extending proximately between outermost sides of the adjacent pairs of the refrigerant flow tubes.

8. The method according to claim 7, wherein substantially the full length of the edges on the one side of the pieces of fin stock are in direct contact with the planar surface of the brazing fixture when secured to the brazing fixture.

9. The method according to claim 7, wherein:

the step of providing the brazing fixture includes providing the brazing fixture with circulation ports extending through the planar surface of the brazing fixture; and the step of passing the heat exchanger components and the brazing fixture through the brazing furnace includes passing heated gases from within the brazing furnace through circulation ports extending through the planar surface of the brazing fixture to pass the heated gases between the pieces of fin stock and the refrigerant flow tubes.

10. The method according to claim 7, wherein the planar surface of the brazing fixture extends substantially the full distance between the header tanks, in direct contact with one of the edges of the fin stock and sides of the refrigerant flow tubes when the heat exchanger components are secured to the brazing fixture.

11. A method for brazing a plurality of heat exchanger components together to form a heat exchanger of a motor vehicle air conditioning system, the method comprising the steps of:

providing heat exchanger components, which include header tanks, refrigerant flow tubes and pieces of fin stock;

providing a brazing tray with planar surface formed from a material to which the heat exchanger components will not braze when passing through the brazing furnace, the brazing tray having a plurality of circulation ports which extend substantially throughout the tray, perpendicular to the planar surface;

securing the heat exchanger components to the brazing tray, with the header tanks spaced apart and aligned parallel to one another, the refrigerant flow tubes extending between the header tanks in a spaced apart and parallel arrangement, and the pieces of fin stock extending between the header tanks and disposed between adjacent ones of the refrigerant flow tubes;

wherein the step of securing the heat exchanger components to the brazing fixture includes disposing substantially a full length of one side of each the refrigerant flow tubes directly against the planar surface of the brazing tray;

passing the heat exchanger components and the brazing fixture through a brazing furnace to braze the heat exchanger components into a singular unit for use as a heat exchanger, passing hot gases from within the brazing furnace through the circulation ports and between the fin stock and the refrigerant flow tubes;

when passing the heat exchanger components through the brazing furnace, maintaining the planar surface of the brazing tray substantially horizontal and beneath the refrigerant flow tubes when brazing the pieces of fin stock to the refrigerant flow tubes; and removing the heat exchanger from the brazing fixture, with the edges of the pieces of fin stock extending proximately between outermost sides of the adjacent pairs of the refrigerant flow tubes.

12. The method according to claim 11, wherein substantially the full length of the edges on the one side of the pieces of fin stock are in direct contact with the planar surface of the brazing fixture when secured to the brazing fixture.

* * * * *